US008184115B2

(12) United States Patent
Sawada et al.

(10) Patent No.: US 8,184,115 B2

(45) Date of Patent: May 22, 2012

(54) PLASMA DISPLAY DEVICE AND METHOD FOR DRIVING THE SAME

(75) Inventors: Takateru Sawada, Osaka (JP); Takahiko Origuchi, Osaka (JP)

(73) Assignee: Panasonic Corporation, Osaka (JP)

( * ) Notice: Subject to any disclaimer, the term of this patent is extended or adjusted under 35 U.S.C. 154(b) by 270 days.

(21) Appl. No.: 12/599,597

(22) PCT Filed: Feb. 9, 2009

(86) PCT No.: PCT/JP2009/000497

§ 371 (c)(1),
(2), (4) Date: Nov. 10, 2009

(87) PCT Pub. No.: WO2009/101784

PCT Pub. Date: Aug. 20, 2008

(65) Prior Publication Data

US 2010/0253673 A1 Oct. 7, 2010

(30) Foreign Application Priority Data

Feb. 14, 2008 (JP) ................................ 2008-032843

(51) Int. Cl.
*G06F 3/038* (2006.01)

(52) U.S. Cl. ......................................... 345/214; 345/60

(58) Field of Classification Search ........................ None
See application file for complete search history.

(56) References Cited

U.S. PATENT DOCUMENTS 5,854,540 A 12/1998 Matsumoto et al.
6,294,875 B1 9/2001 Kurata et al.
7,098,873 B2 8/2006 Homma
7,355,568 B2 4/2008 Homma
2001/0020923 A1 9/2001 Homma
2006/0262043 A1 11/2006 Homma
2007/0252784 A1 11/2007 Maeda et al.
2007/0262921 A1 11/2007 Horie et al.
2008/0211795 A1 9/2008 Homma
2009/0015520 A1 1/2009 Akamatsu et al.

FOREIGN PATENT DOCUMENTS

EP 1986177 A1 10/2008

(Continued)

OTHER PUBLICATIONS

International Search Report for PCT/JP2009/000497, Mar. 24, 2009.

*Primary Examiner* — Paul Huber

(74) *Attorney, Agent, or Firm* — RatnerPrestia

(57) ABSTRACT

Disclosed here is a method for driving a plasma display panel and a plasma display device capable of providing image display with a high contrast ratio and excellent quality by stabilizing an address discharge. According to the method, which is the method for driving a plasma display panel in which discharge cells are formed at intersections of scan electrodes, sustain electrodes and data electrodes, the field—that contains at least one sub-field having the all-cell initializing operation—and the field—that is formed of sub-fields having the selective-cell initializing operation only—are set at a ratio of 1:N (where, N takes an integer of 1 or greater). At the same time, at least in one sub-field of the field having the selective-cell initializing operation only, the scan-pulse width employed for the selective-cell initializing field is determined longer than the scan-pulse width employed for the field containing the all-cell initializing operation.

11 Claims, 8 Drawing Sheets

FOREIGN PATENT DOCUMENTS

| | | | |
|---|---|---|---|
| JP | 08-320668 | A | 12/1996 |
| JP | 10-003281 | A | 1/1998 |
| JP | 2000-221940 | A | 8/2000 |
| JP | 2000-242224 | A | 9/2000 |
| JP | 2001-242823 | A | 9/2001 |
| JP | 2005-321500 | A | 11/2005 |
| JP | 2006-293113 | A | 10/2006 |
| WO | WO 2006/112233 | A1 | 10/2006 |
| WO | WO 2006/112346 | A1 | 10/2006 |
| WO | WO 2007/094296 | A1 | 8/2007 |
| WO | WO 2008/062523 | A1 | 5/2008 |

PLASMA DISPLAY DEVICE AND METHOD FOR DRIVING THE SAME

This application is a U.S. National Phase Application of PCT International Application PCT/JP2009/000497.

TECHNICAL FIELD

The present invention relates to a plasma display panel device and also relates to a method for driving the device.

BACKGROUND ART

An AC type surface discharge plasma display panel, which has become dominant in plasma display panels (hereinafter simply referred to as a panel), has a front plate and a rear plate oppositely disposed with each other and a plurality of discharge cells therebetween.

The front plate is formed of a front glass substrate, a plurality of display electrodes, a dielectric layer, and a protective layer. Each of the display electrodes is formed of a pair of a scan electrode and a sustain electrode. On the front glass substrate, the display electrodes are arranged in parallel with each other, and over which, the dielectric layer and the protective layer are formed to cover the display electrodes.

The rear plate is formed of a rear glass substrate, a plurality of data electrodes, a dielectric layer, a plurality of barrier ribs, and a phosphor layer. On the rear glass substrate, the data electrodes are arranged in parallel with each other, and over which, the dielectric layer is formed to cover them. On the dielectric layer, the barrier ribs are formed so as to be parallel with the data electrodes. The phosphor layer containing phosphors for emitting red (R), green (G), and blue (B) is formed on the surface of the dielectric layer and on the side surface of the barrier ribs.

The front plate and the rear plate are sealed with each other so that the display electrodes are orthogonal to the data electrodes. The discharge space formed between the two plates is filled with discharge gas. The discharge cells are formed at which the display electrodes face the data electrodes.

In the panel with the structure above, a gas discharge occurs in each discharge cell and generates ultraviolet light, which excites the phosphors of R, G, and B to have light emission for color display. One pixel on the panel is formed of three discharge cells containing phosphors R, G, B, respectively.

In the panel operation, a sub-field method is typically employed. In the sub-field method, one field period is divided into a plurality of sub-fields (hereinafter, simply referred to as sub-fields). Gradation display on the panel is attained by combination of lit cells and unlit cells in each sub-field.

Hereinafter will be briefly described the sub-field method. Each sub-field has an initializing period, an address period, and a sustain period. In the initializing period, all of the discharge cells undergo an initializing discharge for erasing previous histories of wall charges for each discharge cell and preparing wall charge necessary for an address operation. In addition, the initializing discharge generates priming (as an initiating agent, i.e., an excitation particle) that decreases discharge delay for generating an address discharge with stability. In the address period that follows the initializing period, scan pulses are sequentially applied to the scan electrodes; at the same time, address pulses suitable for image signals are applied to the data electrodes. The application of the pulses generates a selective address discharge between the scan electrodes and the data electrodes, by which wall charge is formed selectively on the electrodes. In the sustain period, a predetermined number of sustain pulses suitable for luminance weight is applied between the scan electrodes and the sustain electrodes. The application of the pulses allows a discharge cell where wall charge has been formed by the address discharge to undergo a sustain discharge for light emission.

In the sub-field methods, Japanese Unexamined Patent Application Publication No. 2000-242224 (hereinafter, patent document 1) introduces an improved driving method. According to the method, providing any one of an all-cell initializing operation and a selective-cell initializing operation in the initializing period reduces light emission as possible from cells with no contribution to gradation display, enhancing the contrast ratio. In the all-cell initializing operation, all of the discharge cells relating to image display undergo the initializing discharge, whereas in the selective-cell initializing operation, only a discharge cell in which the sustain discharge has occurred in the previous sub-field selectively undergoes the initializing discharge.

To show black partly or entirely on the panel, the discharge cells having pixels of black are maintained in non-emission state during one field period. Hereinafter, such discharge cells are referred to as non-emission discharge cells.

In that case, the scan electrodes sequentially undergo application of the scan pulses, while the data electrodes at the non-emission discharge cells undergo no application of the address pulses in the address period. As a result, the non-emission discharge cells have no address discharge in the address period, and therefore, the cells have no sustain discharge in the sustain period. In this way, black color is partly or entirely shown on the panel.

At that time, for obtaining a higher contrast between images, the luminance of black color should preferably be minimized for the area partly or entirely filled with black. However, even in the driving method introduced in patent document 1, the luminance of black cannot be lowered to zero because of a weak discharge that occurs in all of the discharge cells in the all-cell initializing operation. Thus the luminance of black on the panel has not satisfactorily lowered.

To address the problem, the inventor tried a driving method where a field that contains the all-cell initializing operation (hereinafter, an all-cell initializing field) and a field that contains the selective-cell initializing operation only i.e., contains no all-cell initializing operation (hereinafter, a selective-cell initializing field) are set at a predetermined ratio. However, the selective-cell initializing field with no all-cell initializing operation has a problem of poor priming due to the fact that the priming caused by discharge rapidly decreases with passage of time. Because of such insufficient priming, some sub-fields have increase in interval between application of the pulses—the scan pulses for the scan electrodes and the address pulses for the data electrodes—and discharge generation (hereinafter, the increased interval is referred simply to as discharge delay). Due to the discharge delay, a discharge does not properly occur within the time of the application of the scan pulses to the scan electrodes (hereinafter, scan-pulse width). The inconveniences have invited address failure, resulting in unlit discharge cells.

patent document 1: Japanese Unexamined Patent Application Publication No. 2000-242224

SUMMARY OF THE INVENTION

To address the problem above, the present invention provides a panel-driving method in which a selective address discharge is stabilized in an address period in a selective-cell initializing field set at a predetermined ratio. Employing the method allows a panel to have no unlit discharge cells, providing image display with a high contrast ratio and excellent quality.

The present invention provides a method for driving a plasma display panel in which a discharge cell is formed at an intersection of a scan electrode, a sustain electrode and a data electrode. One field period is formed of a plurality of sub-fields each of which contains an initializing period for generating an initializing discharge in the discharge cells, an address period for applying scan pulses to the scan electrodes so as to generate an address discharge in the discharge cells, and a sustain period for generating a sustain discharge so that the discharge cells emit light with a predetermined luminance weight. The initializing period of each of the sub-fields carries out any one of an all-cell initializing operation and a selective-cell initializing operation. The all-cell initializing operation is for generating the initializing discharge in all of the discharge cells responsible for image display. The selective-cell initializing operation is for selectively generating the initializing discharge in a discharge cell where the sustain discharge has occurred in the previous sub-field. According to the method, an all-cell initializing field is the field that contains at least one sub-field having the all-cell initializing operation; on the other hand, a selective-cell initializing field is the field formed of sub-fields having the selective-cell initializing operation only. The all-cell initializing field and the selective-cell initializing field are set at a ratio of 1:N (where, N takes an integer of 1 or greater), and at the same time, at least in one sub-field, a scan pulse applied in the selective-cell initializing field has an extended width according to N.

The plasma display device is a display device formed of a plasma display panel having discharge cells formed at intersections of scan electrodes, sustain electrodes, and data electrodes. One field period is formed of a plurality of sub-fields each of which contains an initializing period for generating an initializing discharge in the discharge cells, an address period for applying scan pulses to the scan electrodes so as to generate an address discharge in the discharge cells, and a sustain period for generating a sustain discharge so that the discharge cells emit light with a predetermined luminance weight. The initializing period of each of the sub-fields carries out any one of an all-cell initializing operation and a selective-cell initializing operation. The all-cell initializing operation is for generating the initializing discharge in all of the discharge cells responsible for image display. The selective-cell initializing operation is for selectively generating the initializing discharge in a discharge cell where the sustain discharge has occurred in the previous sub-field. According to the method, an all-cell initializing field is the field that contains at least one sub-field having the all-cell initializing operation; on the other hand, a selective-cell initializing field is the field formed of sub-fields having the selective initializing operation only. The all-cell initializing field and the selective initializing field are set at a ratio of 1:N (where, N takes an integer of 1 or greater), and at the same time, at least in one sub-field, a scan pulse applied in the selective-cell initializing field has an extended width according to N.

REFERENCE MARKS IN THE DRAWINGS

Figure 1:
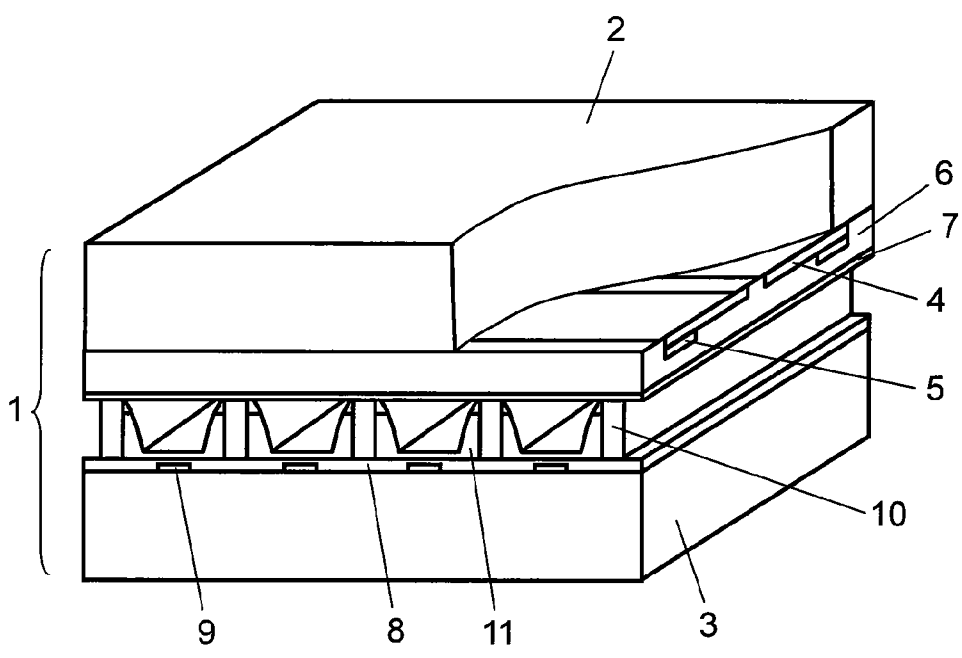
FIG. 1 is a perspective view showing the essential part of the panel of the plasma display device in accordance with a first through a third exemplary embodiments of the present invention.

1 panel
2 front substrate
3 rear substrate
4 scan electrode
5 sustain electrode
6 dielectric layer
7 protective layer
8 dielectric layer
9 data electrode
10 barrier rib
11 phosphor layer
12 data-electrode driving circuit
13 scan-electrode driving circuit
14 sustain-electrode driving circuit
15 timing-signal generation circuit
16 image-signal processing circuit
17 temperature detector
18 APL detector
300 plasma display device
800 plasma display device
1000 plasma display device

DETAILED DESCRIPTION OF THE PREFERRED EMBODIMENTS

Hereinafter will be described the method for driving a plasma display panel and the plasma display device in accordance with the exemplary embodiment of the present invention with reference to drawings.

First Exemplary Embodiment

FIG. 1 is a perspective view showing the essential part of the panel in accordance with a first through a third exemplary embodiments of the present invention. Panel 1 has a structure where glass front substrate 2 and glass rear substrate 3 are oppositely disposed so as to form discharge space therebetween. On front substrate 2, scan electrodes 4 and sustain electrodes 5, which form data electrodes in pairs, are disposed in parallel. Dielectric layer 6 is formed over scan electrodes 4 and sustain electrodes 5. Protective layer 7 is formed on dielectric layer 6.

On rear substrate 3, data electrodes 9 are disposed and they are covered with dielectric layer 8. Barrier rib 10 is disposed on dielectric layer 8 between data electrodes 9 so as to be in parallel with data electrodes 9. Phosphor layer 11 is disposed on the surface of dielectric layer 8 and on the side surface of barrier rib 10. Front substrate 2 and rear substrate 3 are oppositely disposed to each other in a way that scan electrodes 4 and sustain electrodes 5 are orthogonal to data electrodes 9. The discharge space formed between the two substrates is filled with discharge gas, for example, a mixed gas of neon and xenon. The structure of a panel is not necessarily like above; a panel may contain a barrier rib in the form of a grid.

Figure 2:
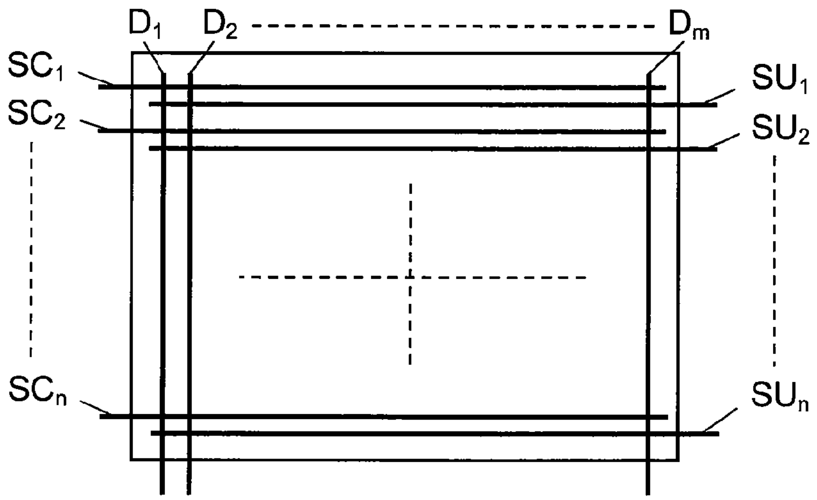
FIG. 2 shows arrangement of the electrodes on the panel of the plasma display device in accordance with the first through the third exemplary embodiments of the present invention.

FIG. 2 shows arrangement of the electrodes on the panel in accordance with the first through the third exemplary embodiments of the present invention. In the horizontal direction, the panel has n scan electrodes SC1-SCn (corresponding to scan electrodes 4 in FIG. 1) and n sustain electrodes SU1-SUn (corresponding to sustain electrodes 5 in FIG. 1). In the vertical direction, the panel has m data electrodes D1-Dm (corresponding to data electrodes 9 in FIG. 1), where n and m take natural numbers of 2 or greater. A discharge cell is formed at an intersection of a pair of scan electrode SCi and sustain electrode SUi (i=1 to n, where i takes any given integer from 1 to n) and data electrode Dj (j=1 to m, where j takes any given integer from 1 to m). That is, panel 10 contains m×n discharge cells in the discharge space.

Figure 3:
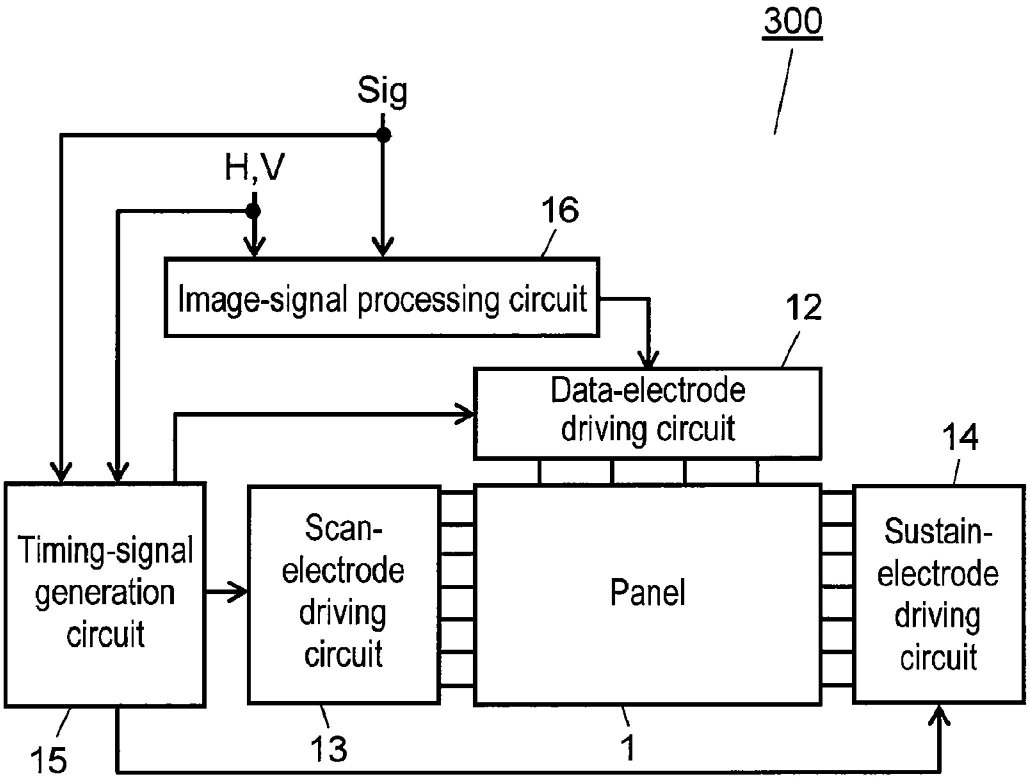
FIG. 3 shows the structure of the plasma display device employing the method for driving a plasma display device in accordance with the exemplary embodiments of the present invention.

FIG. 3 shows the structure of the plasma display device of the first exemplary embodiment of the present invention. Plasma display device 300 has panel 1, data-electrode driving circuit 12, scan-electrode driving circuit 13, sustain-electrode driving circuit 14, timing-signal generation circuit 15, image-signal processing circuit 16, and a power-supply circuit (not shown) for feeding power needed for each circuit block.

Image-signal processing circuit 16 converts image signal Sig into image data according to the number of pixels of panel 1. The image data for each pixel is further divided into a plurality of bits corresponding to a plurality of sub-fields and they are fed into data-electrode driving circuit 12. Receiving the image data for each sub-field, data-electrode driving circuit 12 converts the data into signals suitable for data electrodes D1-Dm for driving them.

Timing-signal generation circuit 15 generates a timing signal according to input signal Sig, horizontal synchronizing signal H and vertical synchronizing signal V to send to each driving circuit block that will be described later. According to the timing signal, scan-electrode driving circuit 13 provides scan electrodes SC1-SCn with driving voltage. According to the timing signal, sustain-electrode driving circuit 14 provides sustain electrodes SU1-SUn with driving voltage.

In the structure of the first embodiment, timing-signal generation circuit 15 provides scan-electrode driving circuit 13 and sustain-electrode driving circuit 14 with any one of a timing signal for the all-cell initializing field and a timing signal for the selective-cell initializing field according to the field. That is, scan-electrode driving circuit 13 provides, on a field basis, scan electrodes SC1-SCn with any one of a driving waveform for the all-cell initializing field and a driving waveform for the selective-cell initializing field. Similarly, sustain-electrode driving circuit 14 provides, on a field basis, sustain electrodes SU1-SUn with any one of a driving waveform for the all-cell initializing field and a driving waveform for the selective-cell initializing field. Details will be described later.

Figure 4:
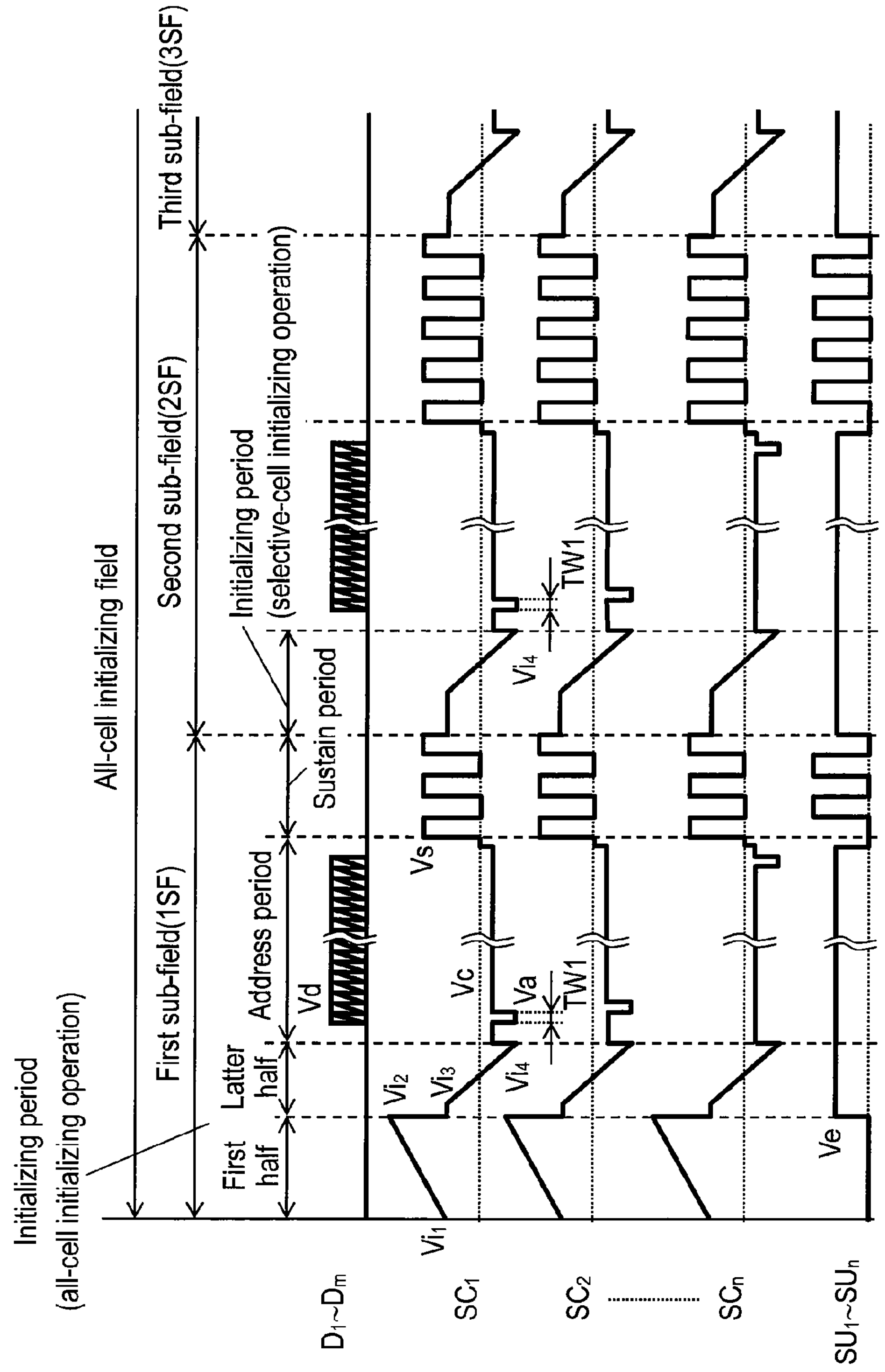
FIG. 4 shows the waveform of driving voltage applied to each electrode of the panel of the plasma display device in the all-cell initializing field in accordance with the first through the third exemplary embodiments of the present invention.
Figure 5:
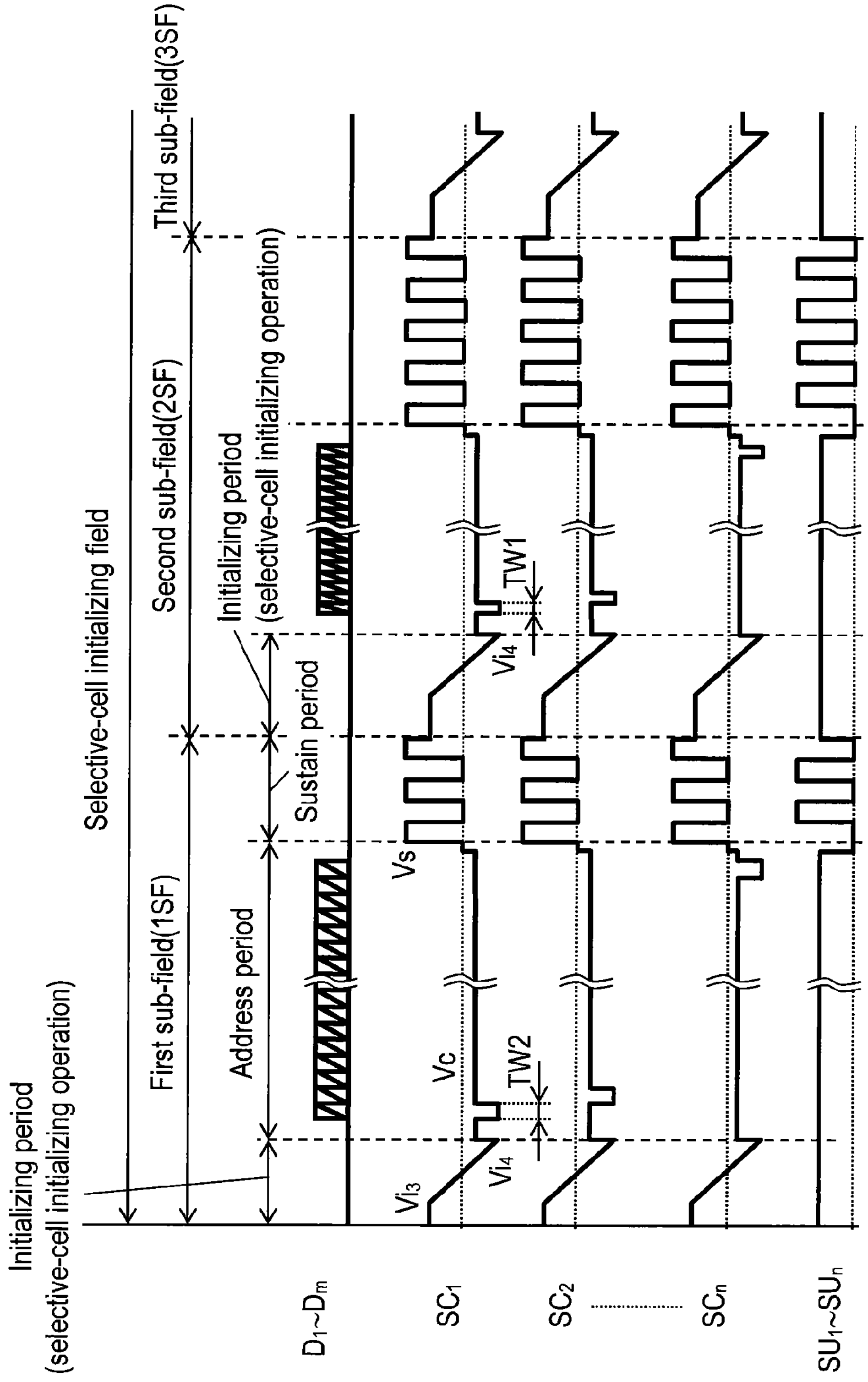
FIG. 5 shows the waveform of driving voltage applied to each electrode of the panel of the plasma display device in the selective-cell initializing field in accordance with the first through the third exemplary embodiments of the present invention.

Next will be described the waveform and the workings of driving voltage for driving the panel. FIGS. 4 and 5 show the waveform of driving voltage applied to each electrode of the panel in accordance with the first through the third exemplary embodiments; FIG. 4 shows the waveform of driving voltage for an all-cell initializing field, while FIG. 5 shows the waveform of driving voltage for a selective-cell initializing field.

First, the waveform and the workings of driving voltage for an all-cell initializing field will be described with reference to FIG. 4.

An all-cell initializing field is formed of an all-cell initializing sub-field having an all-cell initializing operation in the initializing period and a selective-cell initializing sub-field having a selective-cell initializing operation in the initializing period. In FIG. 4, for the sake of explanation, the first sub-field (1SF) is shown as the all-cell initializing sub-field, and the second sub-field (2SF) is shown as the selective-cell initializing sub-field.

First will be described the waveform and the workings of driving voltage in the first sub-field.

In the first half of the initializing period, data electrodes D1-Dm and sustain electrodes SU1-SUn are maintained at a voltage of zero (0V), while scan electrodes SC1-SCn undergo application of ramp voltage with gradually rising waveform starting from voltage Vi1 (that is lower than a discharge-start voltage) toward voltage Vi2 (that exceeds the discharge-start voltage). During the application of the rising-ramp voltage, a weak initializing discharge occurs between scan electrodes SC1-SCn and sustain electrodes SU1-SUn, and between scan electrodes SC1-SCn and data electrodes D1-Dm. Through the initializing discharge, negative wall voltage is built up on scan electrodes SC1-SCn, on the other hand, positive wall voltage is built up on data electrodes D1-Dm and sustain electrodes SU1-SUn. The wall voltage on each electrode represents a voltage generated by wall charges built up, for example, on the dielectric layer, the phosphor layer on the electrodes.

In the latter half of the initializing period, sustain electrodes SU1-SUn are maintained at positive voltage Ve. Scan electrodes SC1-SCn undergo application of ramp voltage with gradually falling waveform, starting from voltage V13 toward voltage V14. On the application of voltage, a second-time weak initializing discharge occurs in all of the discharge cells. Through the discharge, the wall voltage on scan electrodes SC1-SCn and on sustain electrodes SU1-SUn is weakened; on the other hand, the wall voltage on data electrodes D1-Dm is adjusted to a value suitable for the address operation.

In the all-cell initializing operation, as described above, the initializing discharge is generated in all the discharge cells responsible for image display, and priming occurs.

In the address period that follows the initializing period, scan electrodes SC1-SCn are firstly maintained at voltage Vc and then scan-pulse voltage Va with a pulse width of Tw1 is applied to scan electrode SC1 located at the first row.

At this time, positive address-pulse voltage Vd is applied to data electrode Dk (k takes an integer from 1 to m), which corresponds to the discharge cell to be lit at the first row. The application of voltage generates a discharge at the intersection of data electrode Dk to which address pulse voltage Vd has been applied and scan electrode SC1, which triggers a discharge between sustain electrode SU1 located at discharge cell C1*k* and scan electrode SC1. Through the discharge, positive wall voltage is built up on scan electrode SC1 positioned at discharge cell C1*k* and negative wall voltage is built up on sustain electrode SU1. The address operation on the first row is thus completed.

Next, scan pulse voltage Va with a pulse width of Tw1 is applied to scan electrode SC2 located at the second row. At the same time, positive address-pulse voltage Vd is applied to data electrode Dk in data electrodes D1-Dm, which corresponds to the image signal for showing image at the second row. The application of voltage generates a discharge at the intersection of data electrode Dk and scan electrode SC2, which triggers a discharge between sustain electrode SU2 positioned at discharge cell C2*k* and scan electrode SC2. Through the discharge, positive wall voltage is built up on scan electrode SC2 positioned at discharge cell C2*k* and negative wall voltage is built up on sustain electrode SU2. The address operation on the second row is thus completed.

After the address operation is repeatedly carried out until discharge cell Cnk located in the $n^{th}$ row, the address period is completed.

In the sustain period, voltage zero (0V) is firstly applied to scan electrodes SC1-SCn and sustain electrodes SU1-SUn, and then positive sustain pulse voltage Vs is applied to scan electrodes SC1-SCn. Applying sustain-pulse voltage Vs alternately to scan electrode SCi and sustain electrode SUi increases wall voltage built up on scan electrode SCi and sustain electrode SUi and the increased wall voltage is added to the voltage between scan electrode SCi and sustain electrode SUi positioned at discharge cell Cij where the address discharge has occurred. In this way, alternate application of sustain pulses to scan electrodes SC1-SCn and sustain electrodes SU1-SUn repeatedly generates the sustain discharge—according to the number of sustain pulses—in discharge cell Cij where the address discharge has occurred.

Next will be described the waveform and the workings of driving voltage employed for a selective-cell initializing sub-field in the all-cell initializing field with reference to 2SF of FIG. 4.

In the initializing period, sustain electrodes SU1-SUn are maintained at positive voltage Ve; on the other hand, scan electrodes SC1-SCn undergo application of ramp voltage gradually falling toward voltage V14. During the application of voltage above, a weak initializing discharge selectively occurs in discharge cell Cij where a sustain discharge has occurred, that is, between scan electrode SCi and sustain electrode SUi and between scan electrode SCi and data electrode Dj. Through the discharge, negative wall voltage on scan electrodes SCi and positive wall voltage on sustain electrodes SUi are weakened, while the positive wall voltage on data electrodes Dj is adjusted to a value suitable for the address operation. On the other hand, a discharge cell having no address discharge nor sustain discharge in the previous sub-field has no discharge during the initializing period, and therefore maintains the wall charge the same as the condition at the end of the initializing period of the previous sub-field.

The initializing operation in a selective-cell initializing sub-field, as described above, generates the initializing discharge selectively in a discharge cell where the sustain discharge has occurred in the previous sub-field. Therefore, priming does not occur in a discharge cell where the sustain discharge has not occurred.

The operations of address period and sustain period of the selective-cell initializing sub-field are similar to those of the all-cell initializing sub-field and descriptions thereof will be omitted.

Next will be described the waveform and the workings of driving voltage employed for a selective-cell initializing field with reference to FIG. 5.

A selective-cell initializing filed has no all-cell initializing sub-field, which is formed of aforementioned selective-cell initializing sub-field only. The basic operations in the initializing period, the address period, and the sustain period are similar to those of the selective-cell initializing sub-field of the all-cell initializing field and descriptions thereof will be omitted. The description here will be focused on the difference from the selective-cell initializing sub-field of the all-cell initializing field.

In a selective-cell initializing field, at least in one sub-field (that corresponds to 1SF in FIG. 5), a scan pulse has an extended width of Tw2 greater than Tw1 that represents the scan-pulse width employed for an all-cell initializing field.

Scan-pulse width Tw2 in the selective-cell initializing field is great enough to compensate for increase in discharge delay caused by having no all-cell initializing sub-field. This contributes to a stabilized address discharge and accordingly no unlit cell.

According to the structure of the first exemplary embodiment, aforementioned all-cell initializing field and the selective-cell initializing field are set at a ratio of 1:N (where, N takes an integer of 1 or greater)

Here in the description, N is referred to as an insertion ratio of the selective-cell initializing field. Suppose that one cycle is formed of (N+1) field with one all-cell initializing field positioned at the start of each cycle, N represents the number of selective-cell initializing fields that follow the all-cell initializing field.

Figure 6:
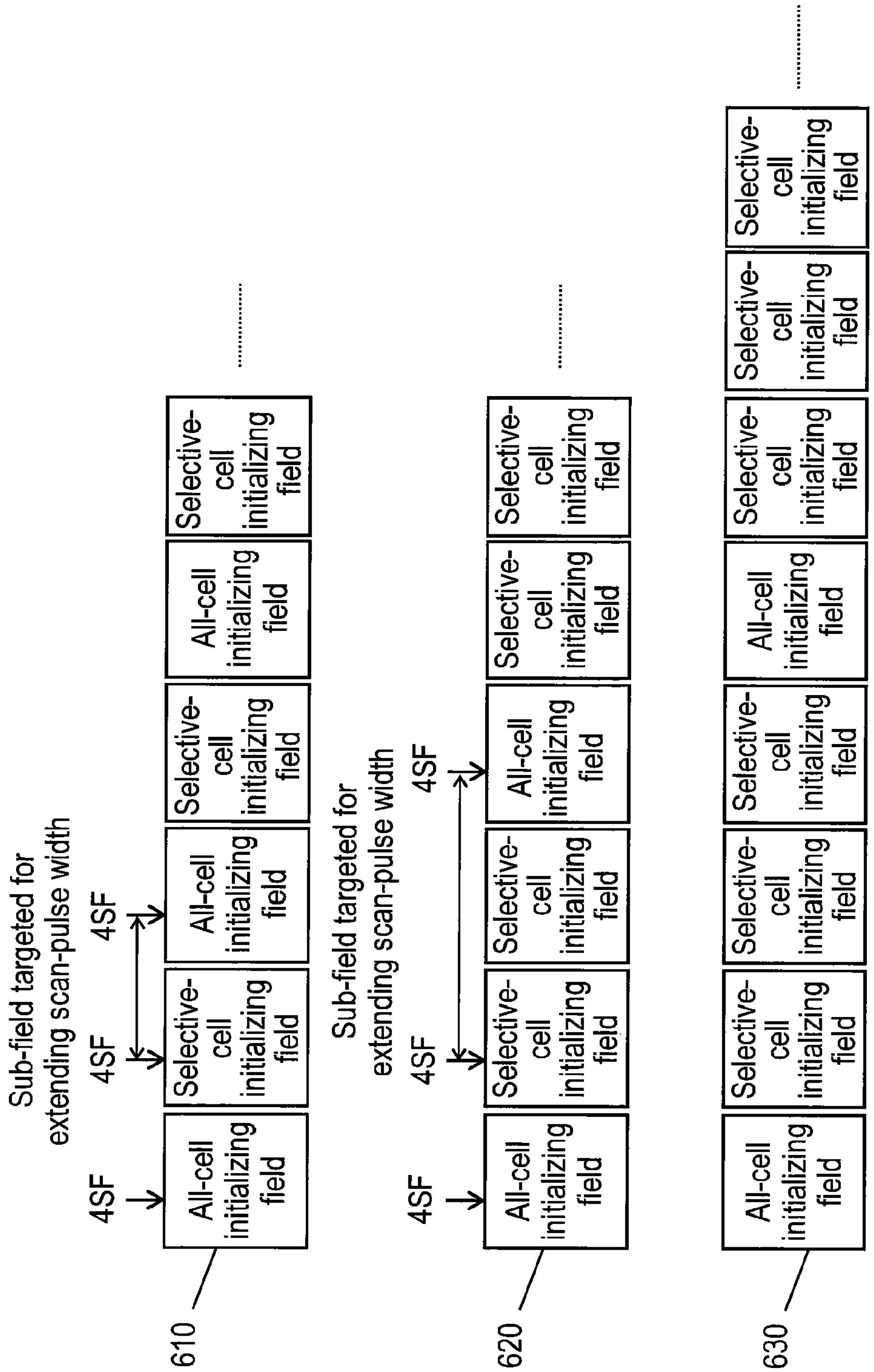
FIG. 6 shows insertion ratio and insertion order of the all-cell initializing field and the selective-cell initializing field in the method for driving the plasma display device in accordance with the first through the third exemplary embodiments of the present invention.

A discharge cell that shows black has no discharge during the selective-cell initializing field. Therefore, according to the exemplary embodiment, a discharge cell being responsible for black color has substantially no light-emission except for a weak emission caused by the all-cell initializing operation in the all-cell initializing field. Compared to the conventional driving method having the all-cell initializing operation in each field, the method of the present invention offers improved contrast between images and sufficiently suppressed luminance of black-shown area (hereinafter, referred simply as black luminance). FIG. 6 shows a specific example.

FIG. 6 shows examples with insertion ratio N of 1 to 3; first example 610 shows the case of N=1, second example 620 shows the case of N=2, and third example 630 shows the case of N=3. In FIG. 6, for example, when insertion ratio N of the selective-cell initializing field is set to 1 (corresponding to first example 610), the driving waveform for the all-cell initializing field and the driving waveform for the selective-cell initializing field are alternately applied to the panel on a field basis. Compared to the conventional driving method having the all-cell initializing operation in each field, the method shown in example 610 reduces black luminance on average for 2 fields to the half.

Similarly, when insertion ratio N of the selective-cell initializing field is set to 2 (corresponding to second example 620), after application of the driving waveform for the all-cell initializing field for one field, the driving waveform for the selective-cell initializing field is applied for consecutive 2 fields. The operation above is cyclically repeated. The method above further reduces black luminance; in this case, black luminance on average for 3 fields is lowered to one-third.

In this way, according to the embodiment of the present invention, black luminance is flexibly controlled as required by determining insertion ratio N to be any desired value.

Next will be described how to determine the sub-field in which a scan pulse has an extended pulse width in the selective-cell initializing field.

Determining the sub-field targeted for extending the scan-pulse width in the selective-cell initializing field depends on insertion ratio N of the selective-cell initializing field, the position of the all-cell initializing sub-field having the all-cell initializing operation, and the combination of the sub-field to be lit.

In all-cell initializing operation, the discharge cells inevitably undergo a discharge in the initializing period, by which priming occurs. Therefore, all the sub-fields positioned between all-cell initializing sub-fields have the priming effect caused by the preceding all-cell initializing operation. Therefore, in the selective-cell initializing field, the scan-pulse width is extended in a sub-field that has priming effect from the preceding all-cell initializing operation.

For example, description will be given on a case where insertion ratio N of the selective-cell initializing field equals 1 (corresponding to first example 610) and the all-cell initializing field contains one and only all-cell initializing sub-field as 1SF. In that case, all the sub-fields from the first sub-field to the last one in the all-cell initializing field have the priming effect from the preceding all-cell initializing operation. Therefore, compared to the all-cell initializing field, the selective-cell initializing field undergoes increase in discharge delay and an unstable address discharge in all the sub-fields. In this case, all the sub-fields of the selective-cell initializing field are the sub-fields targeted for extending the scan-pulse width.

Similarly, in case where insertion ratio N of the selective-cell initializing field equals 1 and the all-cell initializing sub-field of the all-cell initializing field contains one and only all-cell initializing sub-field as 4SF. In this case, all the sub-fields of the selective-cell initializing field on and after 4SF are the sub-fields targeted for extending the scan-pulse width. Description will be given on another case where insertion ratio N of the selective-cell initializing field equals 2 (corresponding to second example 620), and the all-cell initializing sub-field of the all-cell initializing field contains one and only all-cell initializing sub-field as 4SF. In that case, the sub-fields targeted for extending the scan-pulse width are as follows: the sub-fields on and after 4SF in the first selective-cell initializing field that follows the all-cell initializing field; and all the sub-fields in the second selective-cell initializing field that follows the first selective-cell initializing field.

However, in the selective-cell initializing field, extending the scan-pulse width for all the sub-fields where an unstable address discharge can occur inconveniently invites a significant increase in driving time.

To suppress the increase in driving time, according to the structure of the first through the third embodiment, the sub-fields targeted for extending the scan-pulse width should preferably be limited in consideration of combination of the sub-fields to be lit for gray scale display (hereinafter referred to as coding).

For example, in a case where an all-cell initializing field contains one and only all-cell initializing sub-field positioned at 1SF with the use of the coding in which a first sub-field is always lit for all gray scale display except for gradation zero, the sub-fields targeted for extending the scan-pulse width are limited to the first sub-field only.

This is because that, as long as the first sub-field has the address discharge with consistency and priming generated by the sustain discharge, discharge delay will decrease. Therefore, as for the sub-fields successive to the first sub-field, a stable address discharge is expected without extending the scan-pulse width.

Similarly, in a case where an all-cell initializing field contains one and only all-cell initializing sub-field positioned at 1SF with the use of the coding in which a first sub-field or a second sub-field is lit for all gray scale display except for gradation zero, the sub-fields targeted for extending the scan-pulse width are limited to the first sub-field and the second sub-field.

Next will be described how to determine an extending amount of the scan-pulse width in the selective-cell initializing field and the reason for controlling the extending amount of the scan-pulse width in the selective-cell initializing field according to insertion ratio N of the selective-cell initializing field.

Figure 7:
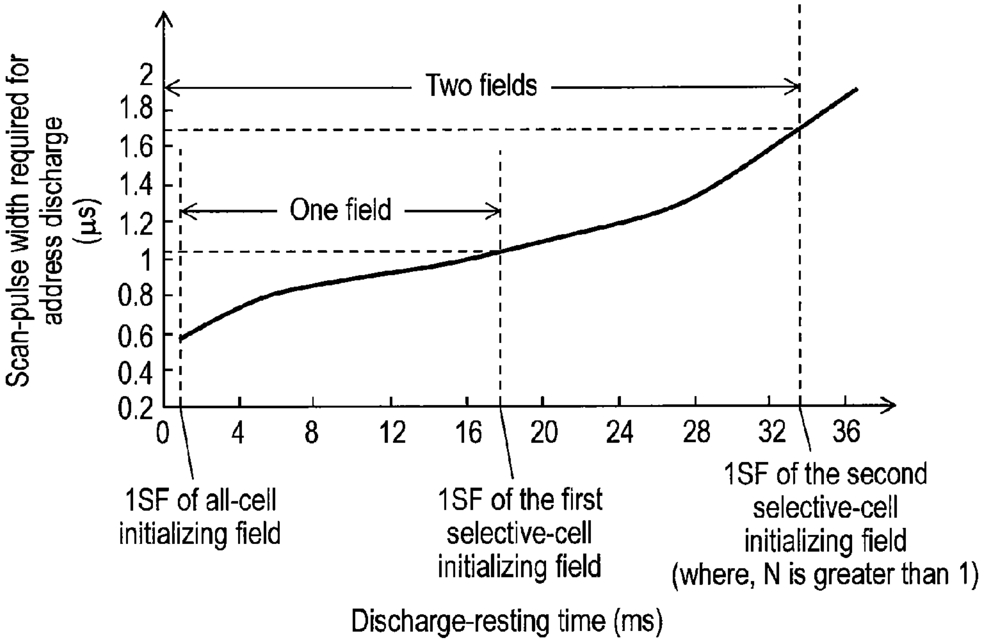
FIG. 7 shows a relationship between a discharge-resting time and a scan-pulse width required for the address discharge.

FIG. 7 shows change in the scan-pulse width required for a stable address discharge with respect to the time lapsed until the address discharge occurs since the initializing discharge completed (hereinafter, a discharge-resting time). In FIG. 7, the horizontal axis represents a discharge-resting time (in the unit ms), and the vertical axis represents a scan-pulse width (in the unit μs) required for a stable address discharge. Immediately after the initializing discharge, priming effect from the discharge allows the address discharge to have a small delay and therefore a small scan-pulse width required for a stable address discharge. However, as the discharge-resting time increases, discharge delay increases due to decrease in priming in discharge cells. This accordingly increases the scan-pulse width required for a stable address discharge.

In the sub-fields targeted for extending the scan-pulse width of the selective-cell initializing field, the discharge-resting time is often greater than that in the all-cell initializing field. Therefore, scan-pulse width Tw1 employed for the all-cell initializing field is not enough for a scan pulse employed for the selective-cell initializing field, resulting in unlit discharge cells.

It is therefore necessary that scan-pulse width Tw2 for the selective-cell initializing field should be determined in consideration of the maximum amount that the discharge-resting time can take in the sub-fields targeted for extending the scan-pulse width.

Each time a discharge occurs in a discharge cell, the discharge-resting time is reset to 0. That is, the discharge-resting time reaches maximum in the case that has no discharge between the all-cell initializing operation and the sub-field targeted for extending the scan-pulse width.

The scan-pulse width required for a stable address discharge is calculated in consideration of the maximum amount that the discharge-resting time can take (hereinafter, maximum discharge-resting time). Scan-pulse width Tw2 for the selective-cell initializing field is thus determined.

Besides, when insertion ratio N of the selective-cell initializing field is 2 or greater, the maximum discharge-resting time gets larger in a field positioned backward (in time) in successively disposed selective-cell initializing fields. Considering above, scan-pulse width Tw2 is determined so as to be greater in a selective-cell initializing field positioned backward in time than in a selective-cell initializing field positioned forward in time.

Here will be described how to determine scan-pulse width Tw2 for the first sub-field of the selective-cell initializing field on the following conditions: the all-cell initializing field has one and only all-cell initializing sub-field at the first sub-field; and insertion ratio N of the selective-cell initializing field is set to 1. In that case, the maximum discharge-resting time in the first sub-field of the selective-cell initializing field is nearly equal to one field period; the maximum discharge-resting time is approx. 16.7 ms at a field frequency of 60 Hz.

Considering the maximum discharge-resting time of 16.7 ms in FIG. 7, scan-pulse width Tw2 for the first sub-field of the selective-cell initializing field is determined to be 1.05 μs or greater.

Similarly, in the case where insertion ratio N of the selective-cell initializing field equals 2, scan-pulse width Tw2 for the first sub-field of the selective-cell initializing field following to the all-cell initializing field is determined to be 1.05 μs or greater, as with the case where insertion ratio N of the selective-cell initializing field equals 1. On the other hand, the discharge-resting time in the first sub-field of the second selective-cell initializing field extends to about two-field periods (corresponding to 33.4 ms). Therefore, scan-pulse width Tw2 employed for the second selective-cell initializing field is determined to be 1.7 μs or greater, which is greater than the scan-pulse width for the first sub-field of the first selective-cell initializing field.

As described above, scan-pulse width Tw2 for the first sub-field of the selective-cell initializing field depends on insertion ratio N of the selective-cell initializing field and the position (in time) of the selective-cell initializing field.

Second Exemplary Embodiment

Changes in panel temperature have an effect on discharge characteristics. Considering above, the description of the embodiment is given on driving control under optimal conditions with no regard to changes in panel temperature.

Figure 8:
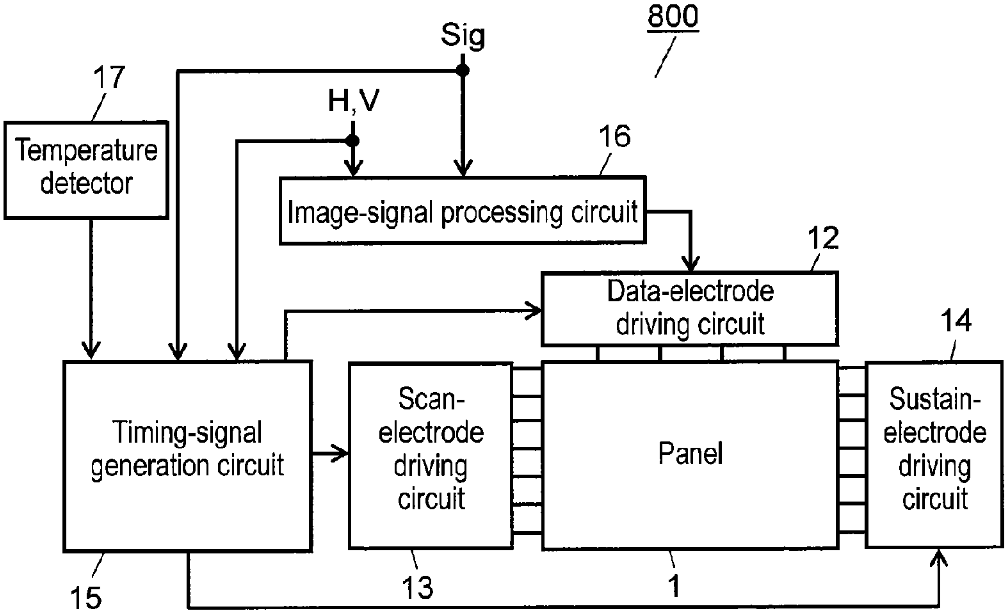
FIG. 8 shows the structure of a plasma display device in accordance with the second exemplary embodiment of the present invention.

FIG. 8 is a circuit block diagram of plasma display device 800 in accordance with the second exemplary embodiment of the present invention.

Basically, the panel structure and the driving voltage waveform of the embodiment are similar to those in the first exemplary embodiment. The structure of the second embodiment differs from that of the first embodiment in that plasma display device 800 has temperature detector 17 for detecting panel temperature so as to determine insertion ratio N of the selective-cell initializing field according to the detected panel temperature.

In plasma display device 800 in FIG. 8, like parts have same reference numerals as in plasma display device 300 in FIG. 3. The signal from temperature detector 17 affects the workings of timing-signal generation circuit 15. The description here will be focused on temperature detector 17 and a section relating to temperature detector 17. Temperature detector 17 detects the panel temperature and outputs it to timing-signal generation circuit 15. According to the panel temperature fed from temperature detector 17, timing-signal generation circuit 15 generates various timing signals for driving panel 1 in a manner that insertion ratio N of the selective-cell initializing field is determined to be greater for a higher temperature of the panel. The timing signals generated by timing-signal generation circuit 15 are fed to each circuit block. As for the rest of circuit blocks, they work similar to those of plasma display device 300 described in the first embodiment.

Next will be described the reason why insertion ratio N of the selective-cell initializing field is determined on the panel temperature in the second embodiment.

Figure 9:
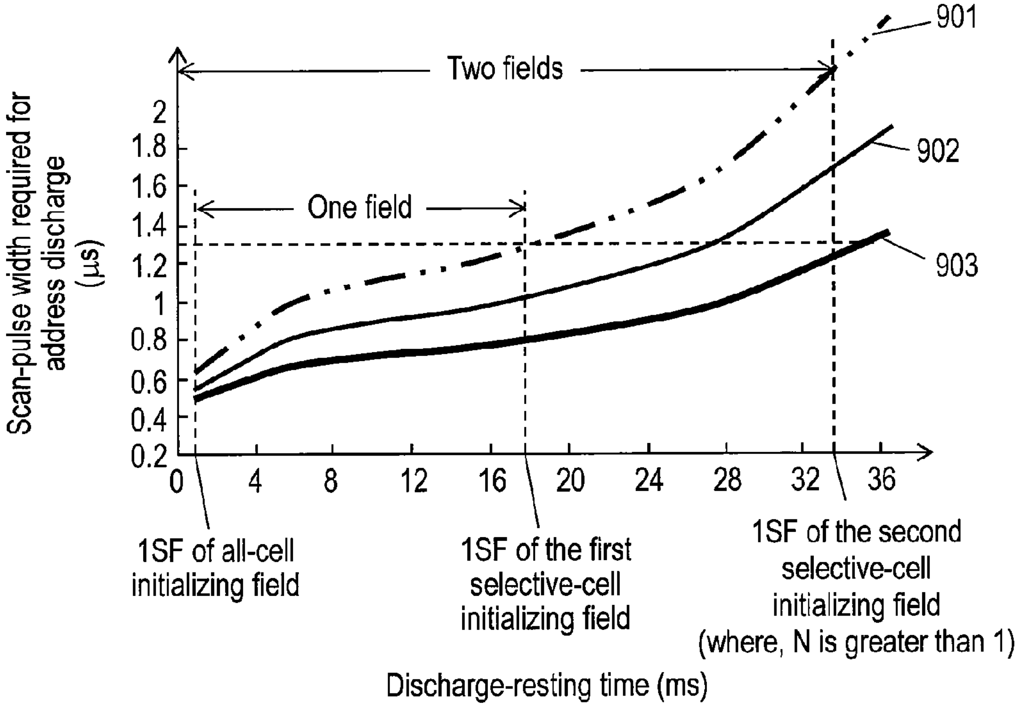
FIG. 9 shows a relationship between a discharge-resting time and a scan-pulse width required for the address discharge when the panel has change in temperature.

In general, discharge-start voltage of a plasma display changes as the panel temperature changes. According to the change in discharge-start voltage, discharge delay also changes. FIG. 9 shows changes in scan-pulse width required for the address discharge with respect to the discharge-resting time at each panel temperature.

In FIG. 9, the horizontal axis represents a discharge-resting time (in the unit ms), and the vertical axis represents a scan-pulse width (in the unit μs) required for address operation. Curves 901, 902, and 903 show each change at panel temperatures of approx. 0° C., 30° C., and 50° C., respectively. As the panel temperature increases, discharge delay decreases, which allows the scan-pulse width required for a stable address discharge to be decreased. That is, in comparison between a case with high panel temperature and a case with low panel temperature at the same scan-pulse width, the case with high panel temperature has longer discharge-resting time, i.e., has less unlit cells. Focusing on the characteristics above, the driving method of the second embodiment has a structure where insertion ratio N of the selective-cell initializing field increases as the panel temperature increases, suppressing black luminance.

In the second embodiment, panel 1 having characteristics shown in FIG. 9 is driven on the following conditions: the all-cell initializing field contains one and only all-cell initializing sub-field positioned at the first sub-field; the scan-pulse width for the first sub-field is determined to be 1 μs; the coding in which a first sub-field is always lit for all gradation display except for gradation zero is used; the scan-pulse width for the first sub-field of the selective-cell initializing field is extended to 1.3 μs; N=1 for the area with a panel temperature lower than 50° C., whereas N=2 for the area with a panel temperature of 50° C. or greater.

Employing the method above allows the area with a panel temperature lower than 50° C. to have stable address operation, eliminating unlit cells. Besides, compared to the conventional driving method in which the all-cell initializing operation is carried out by field, the method of the embodiment decreases black luminance to the half. In the area with a panel temperature of 50° C. or greater, the method of the embodiment further decreases it, which corresponds to one-third of black luminance offered by the conventional method.

In this way, the method of the embodiment changes insertion ratio N of the selective-cell initializing field in consideration of the discharge characteristics that vary as the panel temperature changes, providing the address discharge with stability. As a result, not only stable address operation, but also excellent image display with high contrast is expected with no regard of panel temperatures.

Third Exemplary Embodiment

Figure 10:
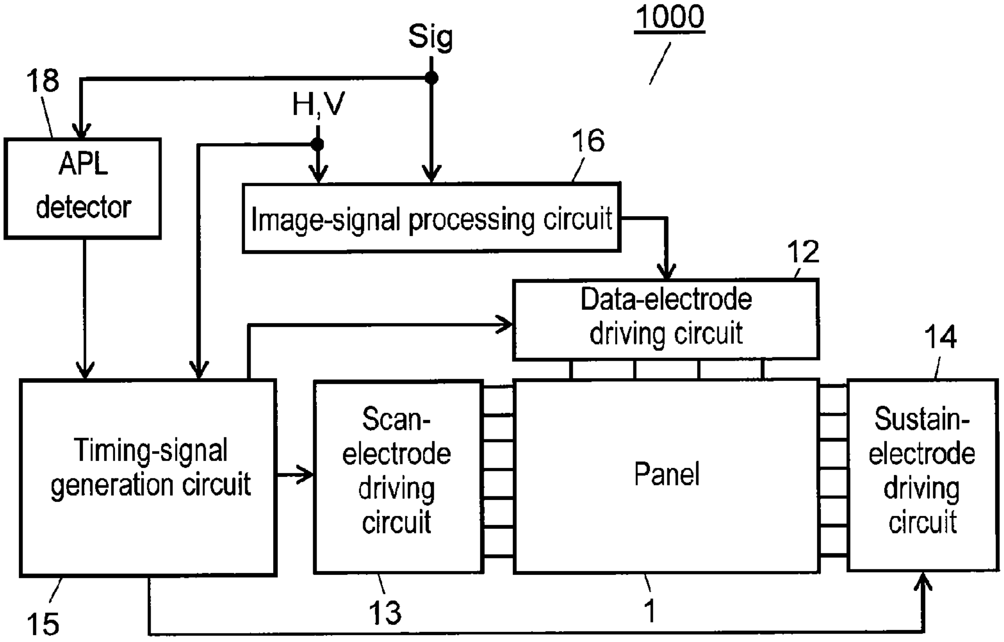
FIG. 10 shows the structure of a plasma display device in accordance with the third exemplary embodiment of the present invention.

Next will be described the structure in accordance with the third exemplary embodiment. FIG. 10 is a circuit block diagram of plasma display device 1000 of the third exemplary embodiment. Basically, the panel structure and the driving voltage waveform of the embodiment are similar to those in the first exemplary embodiment. Plasma display device 1000 of the third embodiment differs from plasma display device 300 of the first embodiment in that plasma display device 1000 has APL detector 18 for detecting APL (average picture level) of images to be shown on the panel so as to determine insertion ratio N of the selective-cell initializing field according to the detected APL.

In plasma display device 1000 in FIG. 10, like parts have same reference numerals as in plasma display device 300 in FIG. 3. The signal from APL detector 18 also affects the workings of timing-signal generation circuit 15. The description here will be focused on APL detector 18 and a section relating to APL detector 18. APL detector 18 detects APL of image signal Sig corresponding to image shown on the panel and outputs the value of APL to timing-signal generation circuit 15. According to the APL value fed from APL detector 18, timing-signal generation circuit 15 generates various timing signals for driving panel 1 in a manner that insertion ratio N of the selective-cell initializing field is determined to be greater for a lower APL value. The timing signals generated by timing-signal generation circuit 15 are fed to each circuit block. As for the rest of circuit blocks of plasma display device 1000, they work similar to those of plasma display device 300 described in the first embodiment.

Next will be described the reason why insertion ratio N of the selective-cell initializing field is determined according to APL in the third embodiment.

Figure 11:
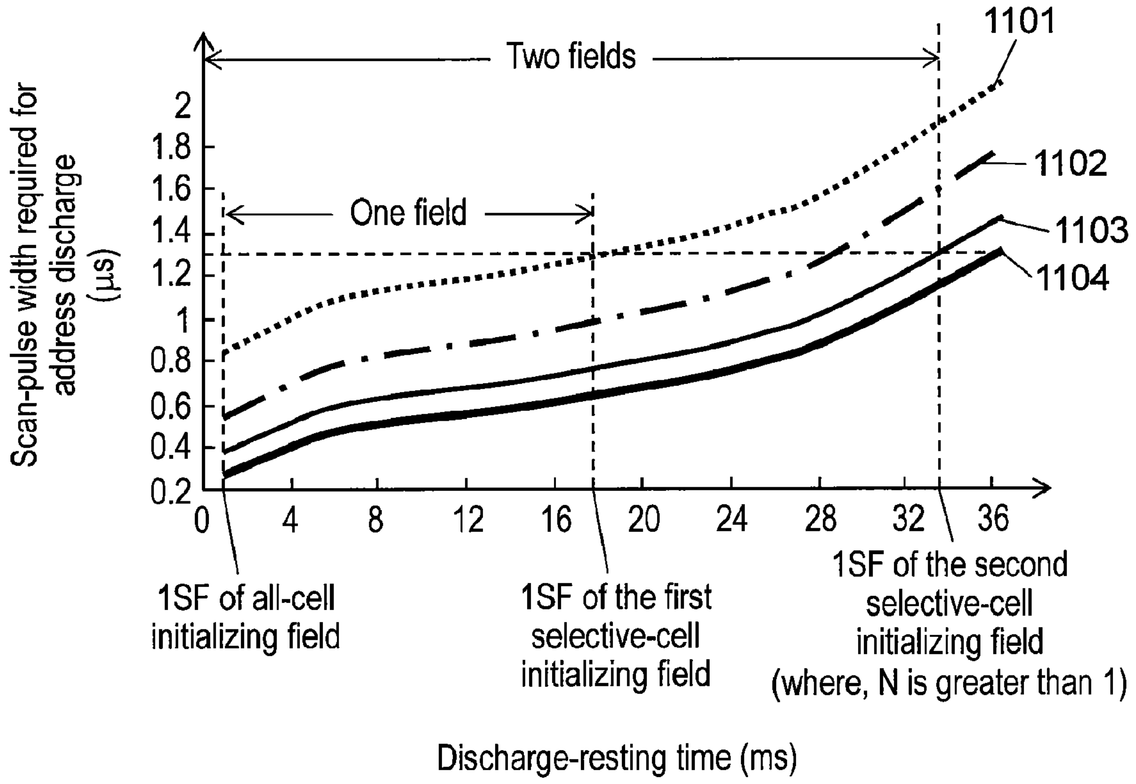
FIG. 11 shows a relationship between a discharge-resting time and a scan-pulse width required for the address discharge when the panel has change in APL.

FIG. 11 shows changes in scan-pulse width required for a stable address discharge with respect to the discharge-resting time at each APL. In FIG. 11, the horizontal axis represents a discharge-resting time (in the unit ms), and the vertical axis represents a scan-pulse width (in the unit μs) required for address operation. Curves 1101, 1102, 1103, and 1104 show each change at an APL of 100%, 50%, 18%, and 1.5%, respectively. As is apparent from FIG. 11, the scan-pulse width required for a stable address discharge increases as APL increases. The description below gives a potential reason that invites above.

Image display with high APL generally allows the image display area to have an increased ratio of sections to be lit, which also increases the ratio of the discharge cells that undergo the address discharge, and accordingly, increases discharge current generated in the address discharge. The circuits that drive electrodes and the electrodes themselves have impedance, and therefore increase in discharge current causes a voltage drop. Due to the voltage drop, voltage to be applied to the discharge cells decreases, by which discharge delay increases. Extending the scan-pulse width required for address discharge compensates for the increase in discharge delay.

In comparison between a case with high APL and a case with low APL at the same scan-pulse width, the case with low APL has longer discharge-resting time, i.e., has less unlit cells. Focusing on the characteristics above, the driving method of the third embodiment has a structure where insertion ratio N of the selective-cell initializing field increases as APL decreases, suppressing black luminance.

In the third embodiment, the panel having characteristics shown in FIG. 11 is driven on the following conditions: the all-cell initializing field contains one and only all-cell initializing sub-field positioned at the first sub-field; the scan-pulse width for the first sub-field is determined to be 1 μs; the coding in which a first sub-field is always lit for all gradation display except for gradation zero is used; the scan-pulse width for the first sub-field of the selective-cell initializing field is extended to 1.3 μs; N=1 for the area having APL of at least 18%, whereas N=2 for the area having APL lower than 18%.

Compared to the conventional driving method in which the all-cell initializing operation is carried out by field, the method of the embodiment decreases black luminance to the half. In the area having APL lower than 18%, the method of the embodiment further decreases it, which corresponds to one-third of black luminance offered by the conventional method.

In consideration of changes in application voltage to the discharge cells caused by difference in APL, the method of the embodiment changes insertion ratio N of the selective-cell initializing field according to APL, providing the address discharge with stability. As a result, not only stable address operation, but also excellent image display with high contrast is expected with no regard of APL.

The aforementioned specific values are for purposes of giving an example only and are not to be construed as limiting values of the embodiments; they should preferably be determined to optimum values suitable for characteristics of panels and driving circuits.

Although the description in the embodiments is given on the structure where the all-cell initializing operation is carried out in the first sub-field, it is not limited to. The all-cell initializing operation may be carried out in other sub-fields.

According to the present invention, as is apparent from the description above, the plasma display device is driven by the method in which the all-cell initializing field and the selective-cell initializing field are set at a predetermined ratio. The driving method stabilizes the address discharge in the selective-cell initializing field, providing image display with a high contrast ratio and excellent quality.

INDUSTRIAL APPLICABILITY

The method for driving a panel of the present invention provides the address discharge with stability. Extending the scan-pulse width in the field—where no all-cell initializing operation causes instability of the address discharge—compensates for the inconvenience, enhancing stability of an address operation. The stable address operation eliminates unlit discharge cells, contributing to image display with a high contrast ratio and excellent quality. The method is therefore suitable for driving a plasma display panel.

What is claimed is:

1. A method for driving a plasma display panel in which a discharge cell is formed at an intersection of a scan electrode, a sustain electrode, and a data electrode, the method comprising:

setting an all-cell initializing field and a selective-cell initializing field at a ratio of 1:N (where, N takes an integer of 1 or greater, the all-cell initializing field is a field that contains at least one sub-field having the all-cell initializing operation, and the selective-cell initializing field is a field that is formed of sub-fields having the selective-cell initializing operation only); and extending, at least in one sub-field, a width of the scan pulse applied in the selective-cell initializing field according to the N, wherein, one field period is formed of a plurality of sub-fields, each of the sub-fields having:

an initializing period for generating an initializing discharge in the discharge cells;

an address period for applying a scan pulse to the scan electrodes so as to generate an address discharge in the discharge cells; and a sustain period for generating a sustain discharge so that the discharge cells emit light with a predetermined luminance weight, each initializing period of the plurality of sub-fields carries out any one of the all-cell initializing operation for generating the initializing discharge in all the discharge cells where an image is to be displayed and the selective-cell initializing operation for selectively generating the initializing discharge in the discharge cells where the sustain discharge has occurred in the previous sub-field.

2. The method for driving a plasma display panel of claim 1, wherein panel temperature is detected and the N is determined according to the detected panel temperature.

3. The method for driving the plasma display panel of claim 1, wherein APL (average picture level) of an image to be shown is detected and the N is determined according to the APL.

4. The method for driving the plasma display panel of claim 1, wherein the N takes 1.

5. The method for driving the plasma display panel in any one of claim 1, wherein a sub-field having the all-cell initializing operation of the all-cell initializing field is one and only sub-field in all of the sub-fields.

6. The method for driving the plasma display panel in any one of claim 1, wherein a sub-field having the all-cell initializing operation of the all-cell initializing field has a minimum value of luminance weight in the sustain period in all of the sub-fields.

7. The method for driving the plasma display panel of claim 2, wherein a sub-field having the all-cell initializing operation of the all-cell initializing field is one and only sub-field in all of the sub-fields.

8. The method for driving the plasma display panel of claim 3, wherein a sub-field having the all-cell initializing operation of the all-cell initializing field is one and only sub-field in all of the sub-fields.

9. The method for driving the plasma display panel of claim 2, wherein a sub-field having the all-cell initializing operation of the all-cell initializing field has a minimum value of luminance weight in the sustain period in all of the sub-fields.

10. The method for driving the plasma display panel of claim 3, wherein a sub-field having the all-cell initializing operation of the all-cell initializing field has a minimum value of luminance weight in the sustain period in all of the sub-fields.

11. A plasma display device in which discharge cells are formed at intersections of scan electrodes, sustain electrodes, and data electrodes, wherein, one field period is formed of a plurality of sub-fields, each of the sub-fields having:

an initializing period for generating an initializing discharge in the discharge cells;

an address period for applying a scan pulse to the scan electrodes so as to generate an address discharge in the discharge cells; and a sustain period for generating a sustain discharge so that the discharge cells emit light with a predetermined luminance weight, each initializing period of the plurality of sub-fields carries out any one of an all cell initializing operation for generating the initializing discharge in all the discharge cells where an image is to be displayed and a selective-cell initializing operation for selectively generating the initializing discharge in the discharge cells where the sustain discharge has occurred in the previous sub-field, wherein, an all-cell initializing field and a selective-cell initializing field are set at a ratio of 1:N (where, N takes an integer of 1 or greater, the all-cell initializing field is a field that contains at least one sub-field having the all-cell initializing operation, and the selective-cell initializing field is a field that is formed of sub-fields having the selective-cell initializing operation only), and a width of the scan pulse applied in the selective-cell initializing field is extended at least in one sub-field according to the N.

* * * * *

UNITED STATES PATENT AND TRADEMARK OFFICE

CERTIFICATE OF CORRECTION

PATENT NO. : 8,184,115 B2
APPLICATION NO. : 12/599597
DATED : May 22, 2012
INVENTOR(S) : Takateru Sawada et al.

It is certified that error appears in the above-identified patent and that said Letters Patent is hereby corrected as shown below:

On the Cover Page, FIELD [87], PCT PUB. DATE: "Aug. 20, 2008" should read --Aug. 20, 2009--.

Signed and Sealed this
Twenty-fifth Day of September, 2012

David J. Kappos
*Director of the United States Patent and Trademark Office*